United States Patent [19]
Salkewicz et al.

[11] Patent Number: 5,970,502
[45] Date of Patent: Oct. 19, 1999

[54] METHOD AND APPARATUS FOR SYNCHRONIZING MULTIPLE COPIES OF A DATABASE

[75] Inventors: William M. Salkewicz, Chelmsford; Ross W. Callon, Bedford, both of Mass.

[73] Assignee: Nortel Networks Corporation, Montreal, Canada

[21] Appl. No.: 08/636,664

[22] Filed: Apr. 23, 1996

[51] Int. Cl.[6] .................................................... G06F 17/30
[52] U.S. Cl. ........................ 707/201; 707/203; 707/104; 379/45
[58] Field of Search ............................. 395/617, 182.14, 395/250, 608, 618, 672, 620, 601, 614, 182.04; 379/45; 707/201, 8, 10, 104, 203

[56] References Cited

U.S. PATENT DOCUMENTS

| | | | |
|---|---|---|---|
| 5,128,926 | 7/1992 | Perlman et al. | 370/248 |
| 5,341,498 | 8/1994 | Connor et al. | 707/104 |
| 5,596,706 | 1/1997 | Shimazaki et al. | 395/182.04 |
| 5,724,575 | 3/1998 | Hoover et al. | 707/10 |
| 5,854,899 | 12/1998 | Callon et al. | 709/238 |
| 5,870,765 | 2/1999 | Bauer et al. | 707/203 |

OTHER PUBLICATIONS

Ullman, Principles of Database Systems, Second Edition, pp. 443–447, Computer Science Press, 1982.

*Primary Examiner*—Thomas G. Black
*Assistant Examiner*—Charles L. Rones
*Attorney, Agent, or Firm*—Blakely, Sokoloff, Taylor & Zafman LLP

[57] ABSTRACT

A method for synchronizing a first database with a second database in which the first database contains a plurality of database records. The first database is divided into a plurality of segments. Each of the segments contains at least one database record. The segments are transmitted sequentially from the first database to the second database until all segments have been transmitted to the second database.

25 Claims, 9 Drawing Sheets

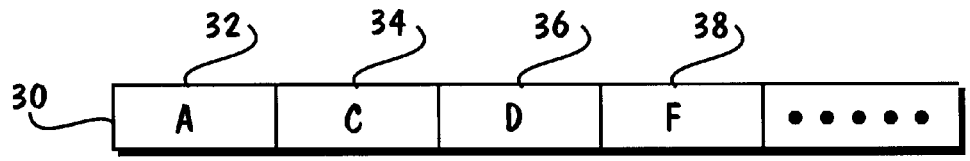
FIG. 2A
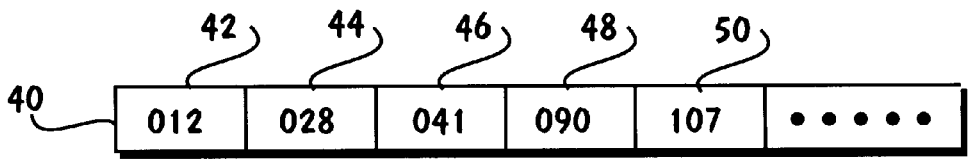
FIG. 2B
| 010 | 120 |
|-----|-----|
| 908 | 217 |
| 020 | 346 |
| 121 | 260 |
| 098 | 522 |
| 813 | 129 |
| 641 | 588 |
| ⋮ | ⋮ |
FIG. 2C

METHOD AND APPARATUS FOR SYNCHRONIZING MULTIPLE COPIES OF A DATABASE

BACKGROUND OF THE INVENTION

1. Field of the Invention

The present invention relates to the maintenance of multiple copies of a database. More specifically, synchronizing multiple copies of a database located on different servers.

2. Background

The use of databases in conjunction with various types of networks is increasing with the growth of networks and network technology. In many situations, it is desirable to manage databases in a distributed manner; i.e., multiple copies of a particular database are stored on different servers connected to a network. Distributed databases provide redundancy such that when a single server fails, the database is accessible through the remaining servers which contain identical copies of the database. Additionally, distributed databases function to distribute the load between multiple servers. Thus, instead of providing a single server to be accessed by all users seeking to retrieve information from the database, several different servers are provided. In this situation, each server supports a subset of users, thereby distributing the load among the various servers. As discussed above, if a single server fails, each remaining server can process a portion of the database requests destined for the failed server.

When a database is distributed such that multiple servers maintain redundant copies of the database, it is important to keep the various copies of the database identical. Maintaining the integrity of the databases includes updating and modifying each database to ensure that all copies of the database are identical. To accomplish this, the various servers must communicate with one another to control and exchange information regarding any modifications to the database. When the database copy on a particular server has been modified, the modified records must not be altered by other servers until all database copies have been updated. Distributed locking schemes are typically used to provide one server with exclusive access to some portion of the database, allowing it to modify a particular record in the database. This type of locking scheme "locks" the remaining servers out of the modified record until the modification is completed and all servers have been updated.

Initial database "synchronization" must be performed when a new server is added to a network or a server is initialized after a server failure or a loss of connection with the network. In these situations, the synchronization process may require copying the entire database from an existing server to the new un-initialized server.

A known technique for synchronizing databases halts all database modifications on all servers until the synchronization process is completed. This method ensures that database records will not be modified during the synchronization process. However, access to the database will be restricted during the synchronization process. If the database being synchronized is large, the delay associated with the synchronization may be unacceptably long. Using this synchronization technique, the delay associated with synchronization increases as the size of the database increases. Furthermore, if the database records are being modified frequently, a large number of transactions will be delayed during the synchronization process.

Another existing technique for synchronizing databases creates a complete copy of the database to be used during the synchronization process. This method permits the existing databases to be modified during the synchronization process, since a copy of the database has already been saved. Any modifications processed during the synchronization process must also be communicated to the new server before the new server can begin servicing database client requests. Although this method prevents database access for a shorter period of time (while a copy of the database is created), the cost associated with this method may be considerably greater than the previous method discussed above. The cost of creating a copy of the database is proportional to the size of the database. A small database will require a corresponding small amount of memory or disk storage area to temporarily store a copy of the database. A larger database will require a greater amount of memory or disk storage area to store the database copy. This dedicated memory or disk storage area increases the overall cost of the server. Additionally, if the size of the database exceeds the available memory or disk storage area, then a copy of the database cannot be created until the memory or disk storage of the server is increased. In this situation, database synchronization cannot be performed due to insufficient server resources. Therefore, it is possible for a database to "outgrow" the capabilities of the server on which the database resides when this synchronization technique is used.

In view of the problems associated with the above synchronization techniques, it is desirable to provide a synchronization system which minimizes both the time during which database access is halted and the cost associated with making copies of the database.

SUMMARY OF THE INVENTION

The present invention provides a system for synchronizing multiple copies of a database located on different servers. The inventive system significantly reduces performance delays associated with prior art synchronization techniques. Furthermore, the present invention does not require a large storage device for storing a complete copy of the database.

An embodiment of the present invention provides a system for synchronizing a first database with a second database in which the first database contains a plurality of database records. The first database is divided into a plurality of segments, where each segment contains at least one database record. The segments are transmitted sequentially from the first database to the second database until all segments have been transmitted to the second database.

Another feature of the invention provides for copying each segment to a storage device and transmitting the segment copy from the storage device to the second database.

Another aspect of the invention provides for the simultaneous and bi-directional updating of two or more databases.

A further aspect of the invention provides a system for updating databases using instance identification information.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIGS. 2A–2C illustrate examples of internal database structures capable of use with the present invention.

DETAILED DESCRIPTION

The following detailed description sets forth numerous specific details to provide a thorough understanding of the present invention. However, those skilled in the art will appreciate that the present invention may be practiced without these specific details. In other instances, well known methods, procedures, components, and circuits have not been described in detail so as not to obscure the present invention.

The present invention is related to the synchronization of multiple copies of a database. The invention is particularly useful with databases which are internally organized into tables or other ordered arrangements. Examples of internal database organizations capable of utilizing the present invention include numerical organization, alphabetical organization, and organizations based on tables or matrices. Many existing databases are already organized in a table or other ordered arrangements from a user interface perspective. However, to best utilize this invention, the internal data structures should be organized in an ordered manner. This type of internal database organization may be referred to as "lexical organization." An important feature of lexical organization is the specific ordering of the data records stored within the database. This specific ordering permits the determination of whether a particular database record comes before or after any particular point in the database. Additional details and examples of this lexical organization are provided below.

Figure 1:
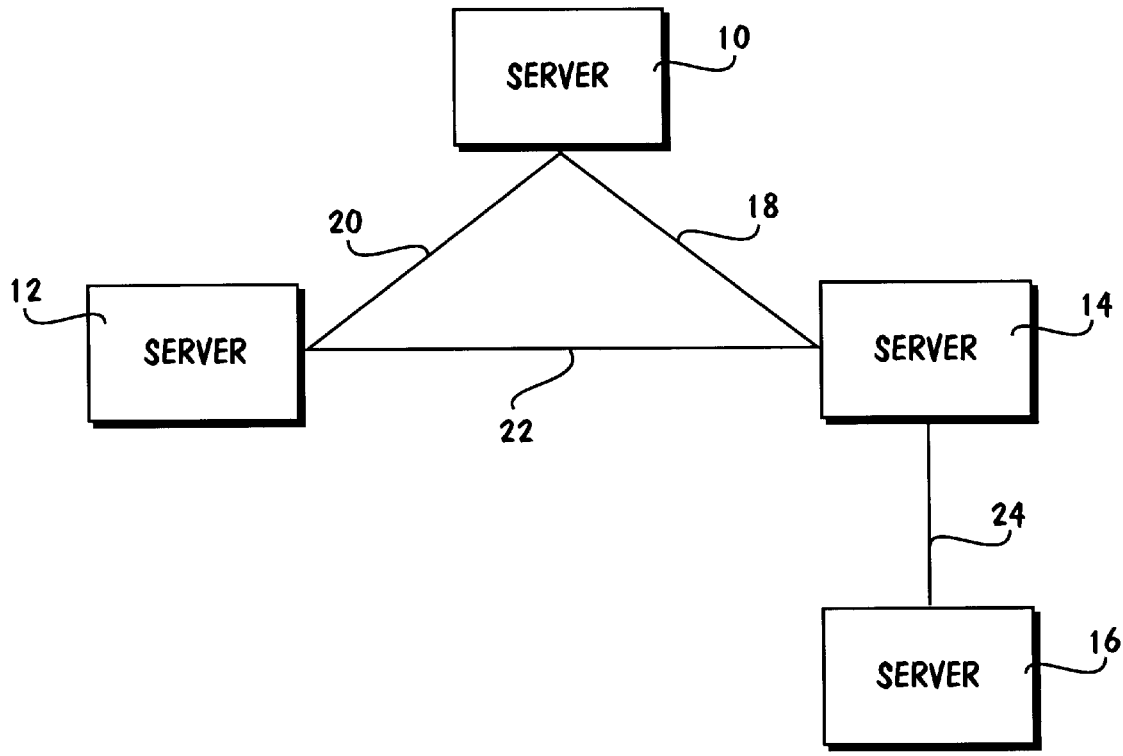
FIG. 1 illustrates a network configuration capable of utilizing the synchronization techniques of the present invention.

Referring to FIG. 1, an example network configuration is illustrated having four different servers connected to one another as shown. The network configuration shown in FIG. 1 is capable of utilizing the present invention for synchronizing multiple copies of a database. Four servers 10, 12, 14, and 16 are connected via network links 18, 20, 22, and 24. In this example, redundant copies of a particular database are stored on each of the four servers. The use of redundant database copies permits distribution of the database processing load among several servers, and provides a backup mechanism for accessing the database should a server or network link fail.

The four servers shown in FIG. 1 may be located at different geographic locations. Therefore, each server may serve a particular geographic region in which it is located. For example, server 10 may serve the western portion of the United States, server 12 may serve the central portion of the United States, server 14 may serve the eastern portion, and server 16 may serve Europe or some other region of the world. If, for example, network server 12 fails or otherwise loses its connection with the network, the remaining servers 10, 14, and 16 may continue operation and provide access to the database. While server 12 is inactive or disconnected from the network, the remaining servers may continue to receive database modification requests and execute those transactions. Therefore, when server 12 reestablishes a connection with the network, its copy of the database must be re-synchronized to match the database copies found on servers 10, 14, and 16. This re-synchronization may include modifying certain database records which were modified by the active servers while server 12 was disconnected from the network. Additionally, if server 12 completely fails, it may be necessary to initialize the server and completely copy all database records to the server during the synchronization process.

During the synchronization process, one or more servers may participate in synchronizing the new server's database. In the example of FIG. 1, servers 10 and 14 are directly connected to server 12, and either or both of the servers may control the synchronization of server 12. Similar synchronization procedures are followed whenever a new server is added to an existing network. In this case, the new server will require a complete copy of the database from an existing server.

The network illustrated in FIG. 1 is only one example of many possible network configurations capable of implementing the present invention. Additionally, it is not necessary that every server contain a copy of the database. For example, a network may contain twenty different servers, but only five servers may actually contain copies of the database. Therefore, it is only necessary to perform the synchronization procedures with servers maintaining copies of the database. The servers containing copies of the database may be dedicated to serving that particular database, or may additionally provide other services.

Although the present invention will be described in certain cases as synchronizing database copies located on two different servers, those skilled in the art will appreciate that the present invention may be practiced to synchronize any number of databases, regardless whether they are located on separate servers or located on the same server. Therefore, the present invention is applicable to the synchronization of any number of databases, regardless of their location with respect to one another.

FIGS. 2A–2C illustrate several examples of internal database structures capable of utilizing the synchronization techniques of the present invention. FIG. 2A illustrates a database 30 having a plurality of database records. Several database records 32, 34, 36, and 38 are illustrated in FIG. 2A. As shown, database records 32–38 are arranged in alphabetical order. Using an alphabetical internal organization, the database application program can determine the lexical (i.e., alphabetic) position of any database record with respect to the other records in the database.

FIG. 2B illustrates another database 40 having a plurality of database records 42, 44, 46, 48, and 50 arranged in numerical order. Based on this numerical arrangement, the database application program can determine the lexical (i.e., numeric) location of any database record with respect to the other database records. For example, database record 46 comes after database records 42 and 44, but before records 48 and 50. Therefore, if the database application program is currently processing database record 46, and a modification request is received for database record 42, the database application program can easily determine that the requested modification applies to a database record which lexically precedes the record being processed.

FIG. 2C illustrates a database 52 arranged in a table format. In this case, the database application program can determine the lexical location of any record based on the row and column in which the record is located. Additional examples of the "lexical" or ordered structure utilized by the present invention may include any type of two-dimensional table with any number of rows and columns. Additionally, various types of multi-dimensional arrays of database records may be used.

Figure 3:
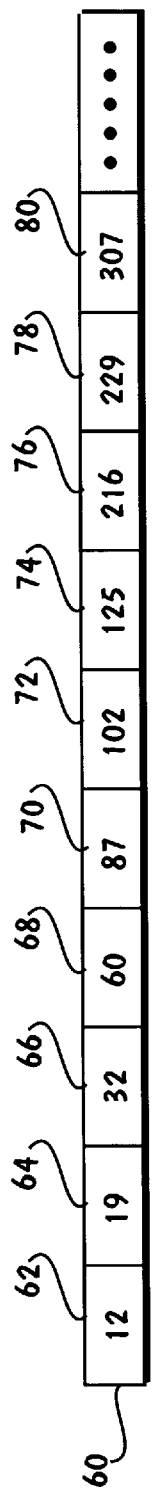
FIG. 3 illustrates a database having a series of records arranged in an ordered manner.
Figure 4A:
FIGS. 4A–4C illustrate several segments containing data from the database shown in FIG. 3.
Figure 4B:
Figure 4C:

FIG. 3 illustrates a database 60 having a plurality of database records 62–80 arranged in numerical order. The synchronization procedure divides the database records into a series of segments. FIGS. 4A–4C illustrate three different segments generated from database 60, shown in FIG. 3. FIG. 4A illustrates a segment 82 containing database records 62, 64, 66, and 68 from database 60. FIG. 4B illustrates a segment 84 containing three records 70–74 from database 60. FIG. 4C illustrates a segment 86 containing database records 76–80.

The segment length varies depending on the application, but must be at least as large as the largest record in the database. Each segment contains one or more entire database records; i.e., individual database records cannot be divided between two different segments. Thus, each segment does not necessarily contain the same number of database records or have the same segment length. As shown in FIGS. 4A–4C, segment 82 contains four database records while segments 84 and 86 each contain three database records. Segments are generated by traversing the database in a lexical manner such that the lexical order of the segments corresponds to the lexical order of the database records. As shown in FIGS. 4A–4C, the first segment 82 contains the first four database records. The next segment 84 contains the next three database records, and segment 86 contains the next set of database records.

Since segments may contain different numbers of database records, segments may have varying lengths. When the segment is generated, database records are included in lexical order until the remaining space in the segment is smaller than the next record. As stated above, an entire record must "fit" within the segment. If the entire record will not fit within the segment, then the segment is determined to be "full" and the record will be contained in the next segment.

The segmenting procedures are performed as part of the database synchronization process, but do not alter the actual database structure or the information contained in the database records. Segments are generated as a temporary mechanism for synchronizing the databases. The actual database records are not modified or otherwise altered by the generation of segments.

Figure 5:
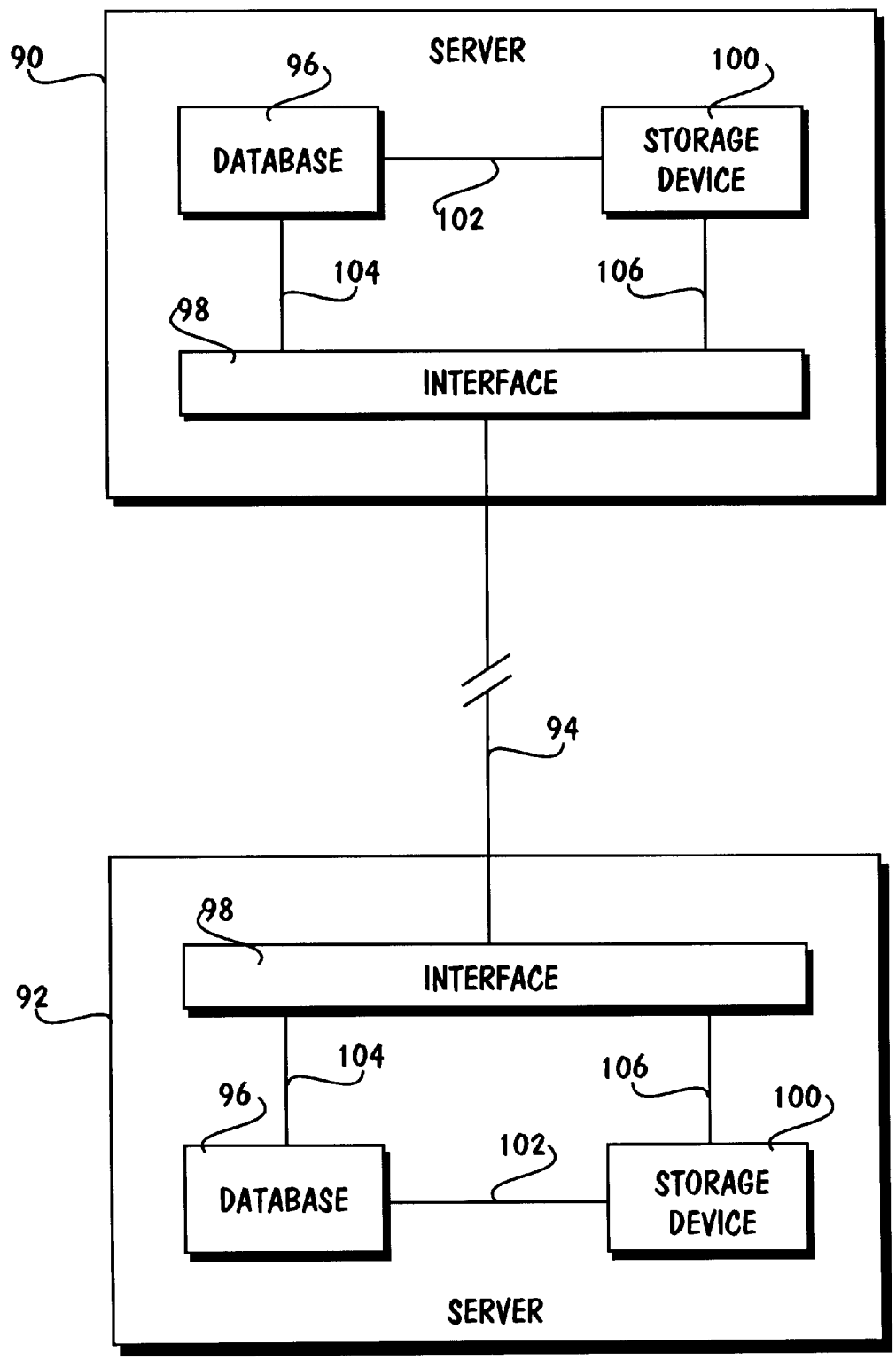
FIG. 5 illustrates a pair of servers capable of implementing the database synchronization techniques of the present invention.

Referring to FIG. 5, a pair of servers 90 and 92 are coupled to one another via communication link 94. Communication link 94 may be any type of connection used to couple two or more servers or other devices. Each server includes a database 96, a communication interface 98, and a storage device 100. Storage device 100 may be a memory device, a disk storage device, or any other mechanism capable of temporarily or permanently storing data from database 96. For example, storage device 100 may be a register within a memory device contained within a server. Database 96 and storage device 100 are coupled together by link 102. Database 96 is coupled to interface 98 through link 104, and storage device 100 is coupled to interface 98 through link 106. Servers 90 and 92 are shown in a simplified form for illustration purposes. Those skilled in the art will appreciate that additional components and connections may be utilized in a particular server.

After a particular segment is generated, the database records contained in the segment are copied to storage device 100 (see FIG. 5). Next, the segment is transmitted to the database in the destination server. When the segment is received by the destination server, an acknowledgement signal is sent from the destination server back to the server which transmitted the segment. When the acknowledgement signal is received, the next segment is generated, copied to the storage device and transmitted to the destination server. This process continues until all database records have been transferred to the destination server.

For example, using the configuration of FIG. 5, if server 92 needs to receive a copy of the database, server 90 will act as the source database, and server 92 will act as the destination database. A segment is generated and copied to storage device 100 in server 90. The segment is then transmitted from server 90 across communication link 94 to the database in server 92. Server 92 sends an acknowledgement signal back to server 90 upon receipt of the segment. When server 90 receives the acknowledgement signal, the next segment is generated, copied to storage device 100, and transmitted to server 92. Additional details and examples regarding the synchronization procedure are provided below.

Figure 6:
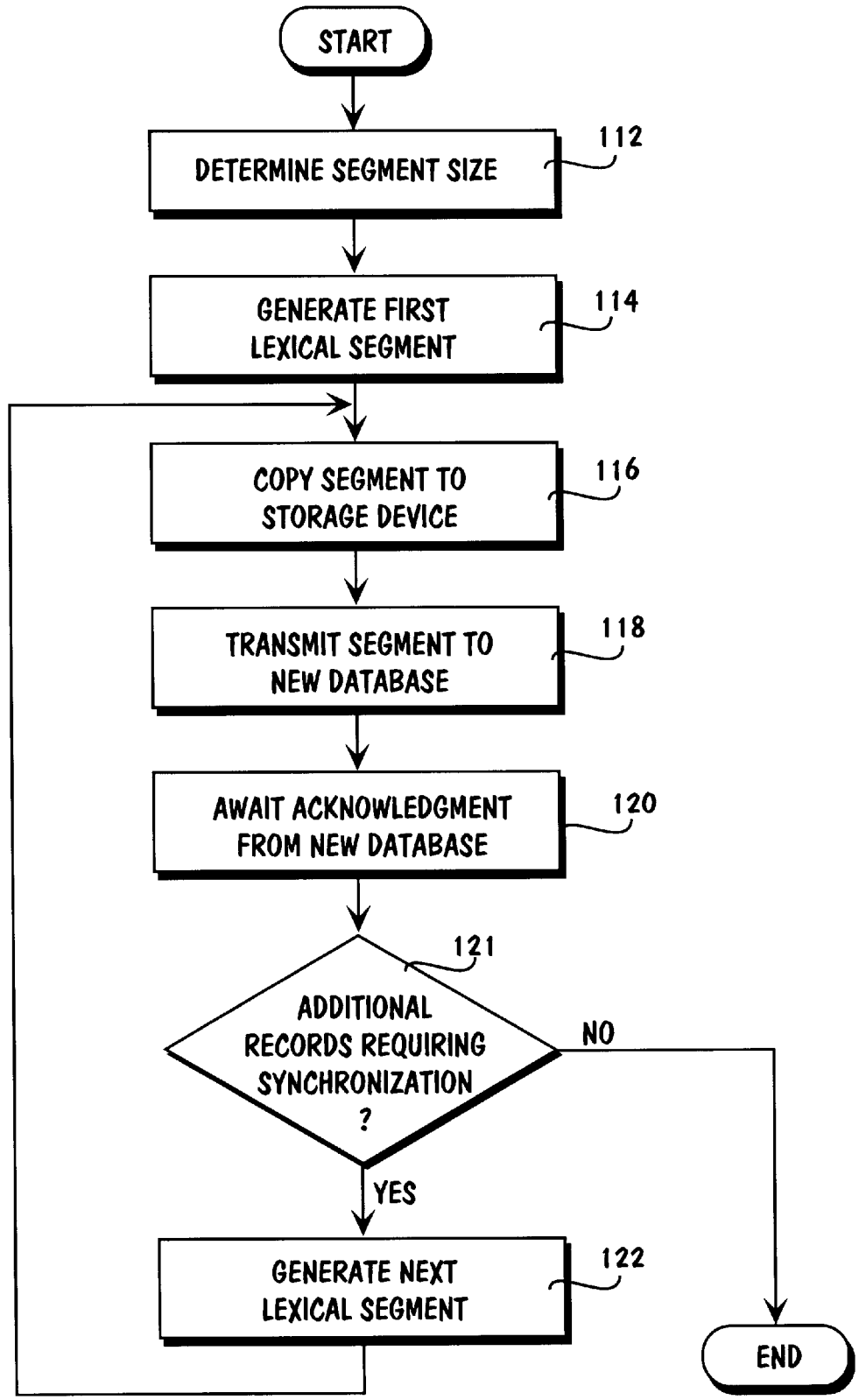
FIG. 6 is a flow diagram illustrating the overall database synchronization process used by the present invention.

Referring to FIG. 6, the overall database synchronization process is illustrated. The following discussion describes the procedure for copying a complete database from a first server to a second server. At step 112, the size of the segment is determined based on several factors. If the size of the database is large, the segment size may be increased to provide more efficient operation of the synchronization process. Additionally, the size of each database record within the database is considered. As noted above, the only restriction on segment size requires that the segment size must be at least as large as the largest record in the database. The capacity and speed of the communication link between the servers should be considered when determining segment size. If the communication link has substantial capacity or substantial speed, then the size of the segment may be increased to improve the overall performance of the synchronization process.

Processor constraints are also important in determining segment size. If the processor has a limited amount of processing capacity available for performing the synchronization process, smaller segments may be used to provide more efficient operation. Finally, segment size is affected by the users' tolerance for delays in accessing the database during the synchronization process. If users demand minimal delays in accessing the database during synchronization, then smaller segments are used. If user delay is not a primary consideration, then longer segments may be used when synchronizing the databases. The above factors are considered and balanced in light of the requirements of each specific application and network environment. Those skilled in the art will appreciate that in certain situations, one or two of the above factors may dominate the determination of segment size.

Referring again to FIG. 6, after the segment size has been determined at step 112, the first lexical segment is generated at step 114. The first lexical segment is generated by selecting database records from the source database. "Source database" refers to the database being used to provide a copy of the database records to the "new" (destination) database. The first segment is typically located at the beginning of the database, and therefore includes the first record or records in the database. Alternatively, the first segment may be located at the end of the database, such that the database is traversed in reverse lexical order. Regardless of the location of the first segment, the synchronization process traverses the database in a lexical manner.

At step 116, the segment generated is copied to a storage device located in the source server (e.g., storage device 100 in FIG. 5). This storage device may be a register or other memory device, or a disk drive. Since the segment size is typically small in relation to the overall database size, the storage device is preferably a register or other memory device located within the server containing the source database. While the database records in the segment are being copied from the source database to the storage device, the database records being copied are "locked" such that the records cannot be modified until the copying step has been completed. After the segment has been copied, the records contained in the segment are "released" for modification. Since the segment size is small in relation to the overall size of the database, the segments may be copied in step 116 quickly, thereby restricting access to only a very small number of records for a short period of time.

After the segment has been copied at step 116, the synchronization process continues at step 118 where the segment is transmitted to the new database. In one embodiment, the segment is copied from the storage device to the new database. In this embodiment, step 118 transmits the copy of the database records from the storage device such that the actual database records are available for modification. However, any modifications to the actual database records will not affect the copy in the storage device. Since the segments are generated and copied to the storage device in lexical order, the segments are transmitted to the new database lexically. In an alternate embodiment, step 118 transmits the segment directly from the source database records to the new database.

After the segment has been transmitted to the new database at step 118, the process awaits acknowledgement of receipt of the segment from the new database at step 120. The acknowledgement from the new database indicates to the source database that the transmitted segment was successfully received and the records contained within the segment were added to the new database.

After an acknowledgement is received at step 120, the routine determines whether additional records require synchronization at step 121. If all records have been synchronized, then the synchronization process is complete and the routine terminates.

If additional records require synchronization, then the routine continues to step 122 where the next lexical segment in the source database is generated. Next, the process returns to step 116 to copy the next segment to the storage device. This copy operation, and all subsequent copies to the storage device, will overwrite the previous segment's data. This process of generating a segment, copying, and transmitting continues until all segments have been transmitted to the new database, at which point, the new database contains a complete copy of the database records as transmitted from the source database.

A feature of the present invention permits the modification of database records in the source database while the synchronization process is occurring. The parallel nature of this new synchronization technique minimizes the service delay experienced by users when accessing the database. However, since database records in the source database may have been modified after being transmitted to the new database, it may be necessary to modify the new database to reflect those changes.

Figure 7:
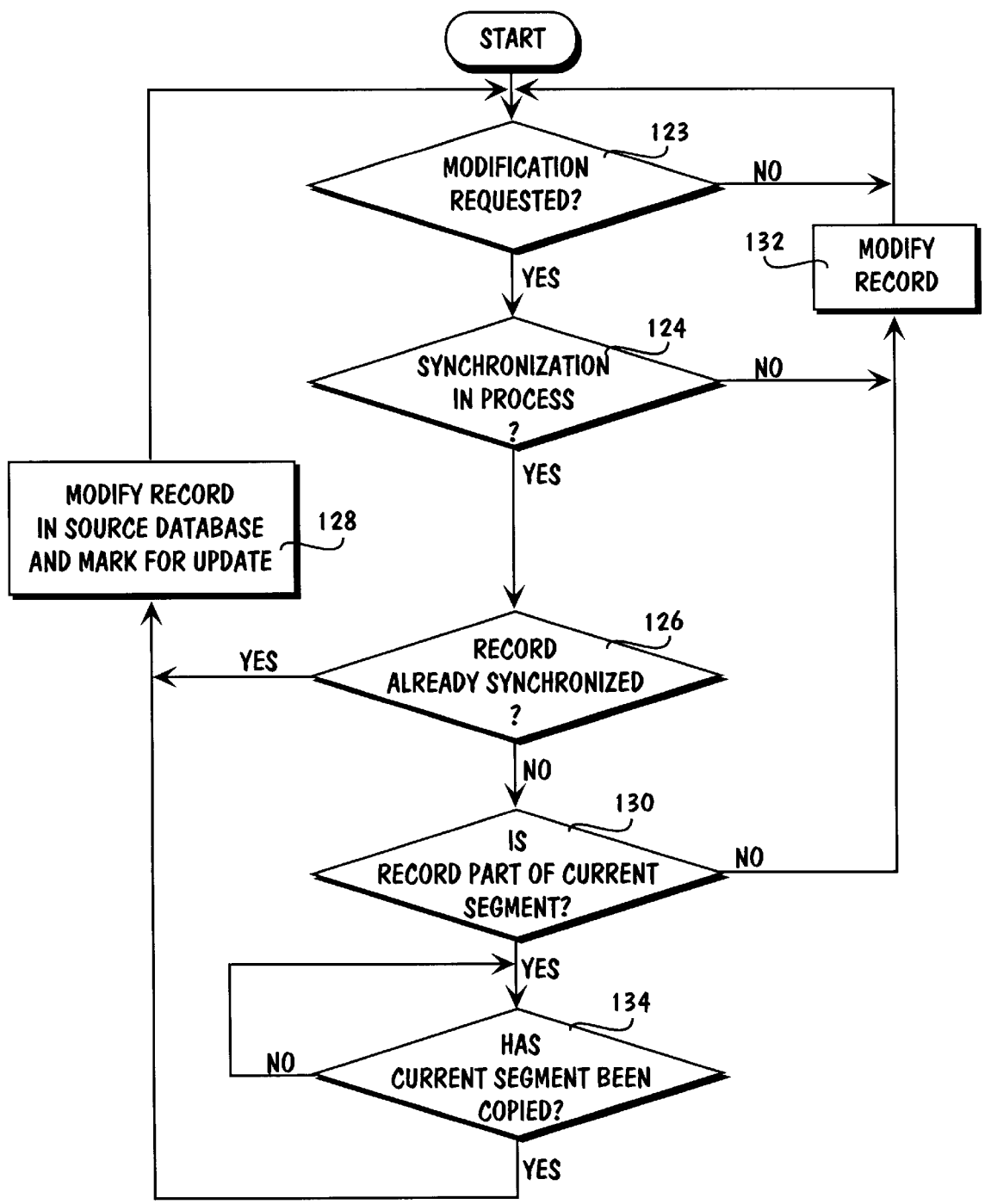
FIG. 7 is a flow diagram showing the handling of a database modification request received during database synchronization.

Referring to FIG. 7, a flow diagram illustrates the proper handling of database modification requests received by the source database during the synchronization process. At step 123, the procedure determines whether a modification has been requested. The inquiry at step 123 is repeated until a modification request is received, at which point the procedure branches to step 124 to determine whether synchronization is in process. If not, the synchronization procedures allow the record to be modified at step 132. Otherwise, the routine branches to step 126 to determine whether the record for which modification is requested has already been synchronized. If the record has already been synchronized, then the routine branches to step 128 where the record is modified in the source database and marked for update. Since the record has already been copied and transmitted, the new database contains a copy of the record prior to this latest modification. After or during the database synchronization processing, the new database must be updated to reflect this modification to the record. Therefore, the marking of the record will indicate the required updating independent of the synchronization process. After modifying and marking the record in step 128, the routine returns to step 123 to await the next modification request.

If the modification request received is for a record not yet synchronized, then the routine branches from step 126 to step 130 to determine whether the record sought to be modified is part of the current segment being copied to the storage device. If the record is not part of the current segment, this indicates that the record has not yet been transmitted to the new database. In this situation, the routine branches to step 132 where the record if modified. Since the modified record has not yet been transmitted to the new database, the modified record will be copied at the appropriate later time during the synchronization process, and no marking for future update is required.

If the modification request is for a record which is part of the current segment, step 130 branches to step 134 to determine whether the current segment has been copied to the storage device. If the segment has not been copied, or is currently being copied, step 134 branches back to itself, thereby halting or "freezing" the modification request until the current segment has been copied to the storage device. Once the copy has been completed, the routine branches from step 134 to step 128 where the record is modified in the source database and marked for update upon completion of the synchronization process. Since the storage copy of the segment is transmitted to the new database rather than the actual working copy of the record, the modification performed at step 128 will not be transmitted to the new database. Therefore, the record must be marked for update independent of the synchronization process.

Figure 8A:
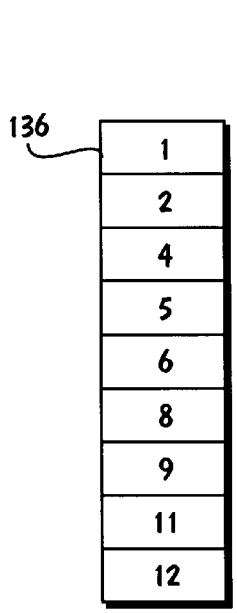
FIGS. 8A–8F illustrate an application of the inventive synchronization technique to a particular database.

Referring to FIGS. 8A–8F, an example is illustrated applying the synchronization process to a particular database. FIG. 8A illustrates a database 136 containing a table of database records arranged in numerical order. For this example, a segment size has been selected such that any three records in the database may be contained within the segment. As illustrated in FIG. 8A, database 136 contains nine records in numerical order.

Figure 8B:

FIG. 8B illustrates a first segment 138 containing the first three records of database 136. Segment 138 is then copied to the storage device and transmitted to a new database 144, illustrated in FIG. 8E. FIG. 8E shows that the first three database records are copied from database 136 to database 144. If, after segment 138 has been copied to database 144, but before completion of the synchronization process, a modification request is received to modify database record "2", the modification will be permitted in database 136, and marked for update. Note that database 144 will then contain an obsolete version of record "2." Thus, independent of the synchronization process, record "2" in database 136 must be transmitted to database 144 using the normal database updating procedures.

Figure 8C:
Figure 8D:
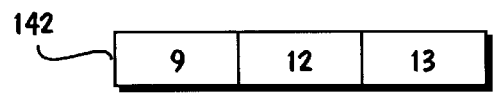
Figure 8E:
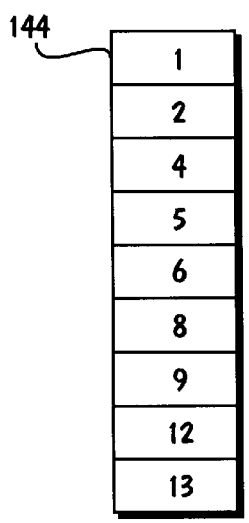

After the first segment 138 has been transmitted to database 144, and an acknowledgement received from database 144, the next segment is generated, as shown in FIG. 8C. Segment 140 contains the next three records from database 136. Segment 140 is then copied to the storage device and transmitted to new database 144. If a modification request is received to delete record "8" while segment 140 is being copied to the storage device, that modification request will be halted or "frozen" until segment 140 is completely copied to the storage device. Once segment 140 has been copied to the storage device, database record "8" is deleted from database 136 and also marked for update such that all other servers learn of the deletion. Database record "8" will be transmitted to new database 144 since the record was contained in the segment copied to the storage device prior to the deletion.

If a modification request is received to delete record "11" prior to generation of segment 142 (FIG. 8D), then the record will be deleted from database 136, without marking the record for update. No marking is required because the record has not yet been copied to the storage device.

Additionally, a new record "13" may be added to database 136 prior to completion of the synchronization process. In this case, the last segment, illustrated in FIG. 8D, will contain the last three records of database 136. Segment 142 does not contain "11" because it was deleted prior to generation of the segment. Database record "13" is included in segment 142 because it was added prior to generation of the segment.

Figure 8F:
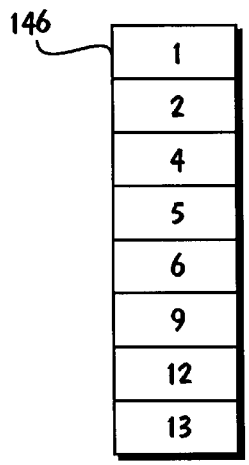

After segment 142 is transmitted to the new database, synchronization is complete and new database 144 is shown in FIG. 8E. Although synchronization is complete, database record "2" must be updated to reflect the modification performed after the record was transmitted to new database 144. Also, record "8" was deleted from database 136 after the record was copied to new database 144. Therefore, record "8" must be deleted from database 144. FIG. 8F illustrates a completely synchronized and modified database 146 with record "8" removed and including a modified copy of record "2."

The above example and discussion describe situations in which records in a source database are transmitted to a new database. However, those skilled in the art will appreciate that the invention may also be used to provide simultaneous and bidirectional updating of two or more databases. For example, a first database may contain a current copy of certain records, but an old or obsolete copy of other records. Similarly, a second database may contain both current and obsolete database records. Thus, for certain records the first database will act as the source database, and for other records the second database will act as the source database. Using the teachings of the present invention, the first and second databases may be updated simultaneously across a bi-directional link between the databases.

Figure 9A:
FIGS. 9A–9C show an application of the present invention to a database organized using a hashing scheme.
Figure 9B:
Figure 9C:
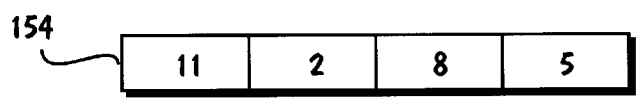

Referring to FIGS. 9A–9C, an example is shown applying the present invention to a database organized using a hashing scheme. In this example, the hashing scheme selected one of three hash buckets based on modulo 3 arithmetic performed on the record number. FIG. 9A illustrates the remainder 0 hash bucket, FIG. 9B illustrates the remainder 1 hash bucket, and FIG. 9C illustrates the remainder 2 hash bucket. In this example, the records within each hash bucket have not been maintained in any particular order. Therefore, to provide the necessary lexical ordering, each hash bucket may be considered as a separate segment. Accordingly, the segment size corresponds to the largest hash bucket. By increasing the number of hash buckets, the segment size may be reduced. Thus, the modulo operation may utilize a larger number to provide a greater number of hash buckets and, therefore, a greater number of smaller segments.

An alternative hashing scheme provides for hash buckets which are maintained in numerical order. In this situation, the hash number and record number may be used to provide a lexical ordering of the database records. The segments may be smaller than the size of the largest hash bucket such that each bucket contains several segments.

In another embodiment of the invention, the source database is divided into a plurality of segments, as discussed above. Rather than containing entire database records, the segments contain only "instance identification" information, such as an instance number, sequence number, or other information indicating the last modification processed for the record. For example, a sequence stamp may indicate the date and time of the last modification. Those skilled in the art will appreciate that various methods may be used to indicate the last modification of a particular record. The instance identification information provides a mechanism for determining which database has the current or up-to-date version of a database record, without requiring full copying of the entire record.

If the records in each database contain the same instance identification information, then the record is already synchronized. Therefore, the record need not be transmitted to the destination database because the destination database already has a current copy of the record. However, if the instance identification information does not match, then the servers determine which record is more up-to-date. The entire up-to-date database record is eventually transmitted from the up-to-date database to the out-of-date database in the manner used independently for updating database records.

This embodiment is particularly useful when the instance identification information is small with respect to the record size. Rather than synchronizing by copying each record in its entirety, only the much smaller instance identification information is transmitted, thereby saving time and conserving system resources.

Figure 10:
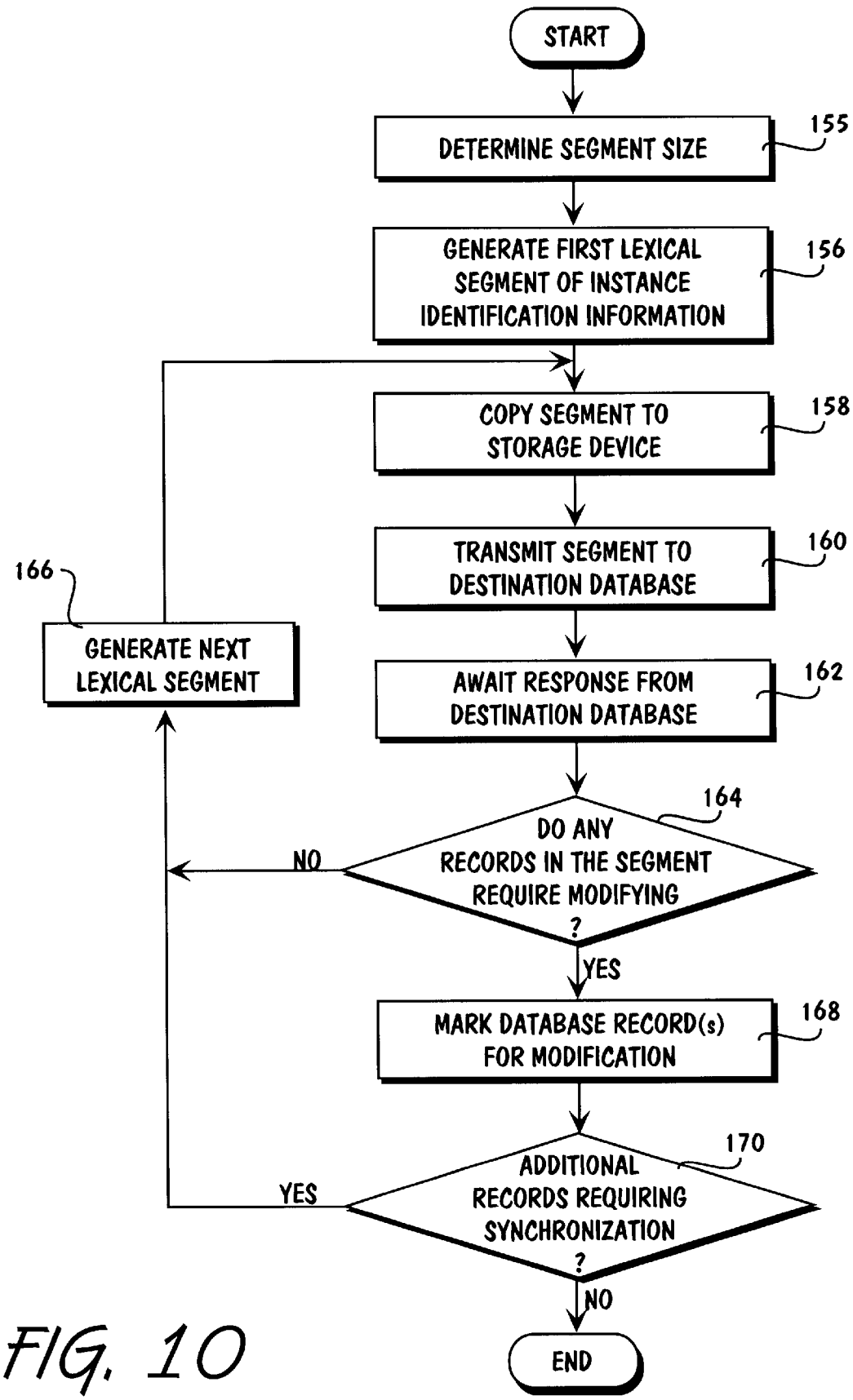
FIG. 10 is a flow diagram illustrating an alternate embodiment of the present invention.

Referring to FIG. 10, the alternative embodiment discussed above is illustrated. At step 155 the segment size is determined, and at step 156 a first lexical segment of instance identification information is generated. The first lexical segment contains the instance identification information of one or more records of the source database. Step 158 copies the segment to the storage device and step 160 transmits the segment to the destination database. As discussed above with reference to FIG. 6, the segment may be transmitted from the storage device or directly from the source database records.

Step 162 awaits a response regarding whether the instance identification information transmitted from the source database matches the instance identification information of the records in the destination database; i.e., whether the destination database contains a current copy of the record. At step 164, the process determines whether any records in the segment require modification. If modification is not required, then the process branches to step 166 where the next lexical segment is generated. If step 164 determines that one or more records in the current segment require modification, then the process branches to step 168 where the database record(s) requiring modification are marked for modification. The marked record(s) are modified independently of the synchronization process. After marking the record for update, the process continues to step 170 to determine whether additional records require synchronization. If all records have been synchronized then the synchronization process is complete and the routine terminates. If additional records require synchronization then the routine branches from step 170 to step 166 where the next lexical segment is generated.

The factors affecting the choice of segment size are similar to those discussed above with respect to FIG. 6. However, in this embodiment, the segment size is restricted to being at least large enough to hold the largest instance identification information that applies to any record in the database. Usually, instance identification information is smaller than the entire database record, thereby reducing segment size and the resources required to accomplish synchronization.

Synchronizing databases by only exchanging instance identification information is, for example, used by OSPF (Open Shortest Path First) and PNNI (Private Network to Network Interface), two dynamic link state routing protocols used to manage routing in large networks. In this situation, each router or switch maintains a link state database that must be synchronized and kept up-to-date by all switches and routers. Those skilled in the art will appreciate that OSPF and PNNI represent examples of link state routing protocols, but that other protocols and methods may be utilized to practice the invention.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. A method for synchronizing a first database with a second database, wherein said first database contains a plurality of database records, said method comprising the steps of:

lexically dividing said first database into a plurality of segments; and sequentially transmitting each segment from said first database to said second database until all segments are transmitted to said second database for storage in said second database, wherein segments not in current transmission may be modified.

2. The method of claim 1 wherein said step of sequentially transmitting each segment includes copying each segment to a storage device and transmitting said segment copy from said storage device to said second database.

3. The method of claim 2 wherein said storage device is a memory device capable of storing at least one segment.

4. The method of claim 2 wherein said storage device is a disk storage device capable of storing at least one segment.

5. The method of claim 2 further including the step of preventing modification of database records currently being copied to said storage device.

6. The method of claim 1 further including the step of awaiting an acknowledgement from said second database after transmitting each segment to said second database.

7. The method of claim 1 further including the step of permitting modification of database records in said first database after said database records have been transmitted to said second database.

8. The method of claim 1 further including the step of permitting modification of database records in said first database before said database records have been transmitted to said second database.

9. The method of claim 1 wherein said first database is located on a first server and said second database is located on a second server, said first and second servers coupled to one another through a communication medium.

10. The method of claim 1 wherein said first database is arranged in a lexical order.

11. The method of claim 1 wherein each segment contains a plurality of database records from said first database.

12. A method for synchronizing a first database with a second database, wherein said first database contains a plurality of database records, said method comprising the steps of:

a) lexically dividing said first database into a plurality of segments, wherein each segment contains at least one database record;

b) sequentially copying each segment from said first database to a storage device;

c) transmitting said copy of said segment from said storage device to said second database for storage in said second database, wherein segments not in current transmission may be modified; and d) repeating steps b) and c) until all segments are transmitted to said second database.

13. The method of claim 12 further including the step of awaiting an acknowledgement from said second database after transmitting said copy of said segment to said second database.

14. The method of claim 12 further including the step of permitting modification of database records in said first database after said database records have been transmitted to said second database.

15. The method of claim 12 further including the step of permitting modification of database records in said first database before said database records have been transmitted to said second database.

16. The method of claim 12 further including the step of preventing modification of database records currently being copied to said storage device.

17. A method for synchronizing a first database with a second database, wherein said first database contains a plurality of database records, said method comprising the steps of:

lexically dividing said first database into a plurality of segments, wherein each segment contains instance identification of at least one database record, said portion of said record containing instance identification information for determining whether said second database contains a current copy of said record;

sequentially transmitting each segment from said first database to said second database for storage in said second database, wherein segments not in current transmission may be modified; and marking an entire database record from said first database for update if a second database contains an obsolete version of the database record.

18. The method of claim 17 wherein said step of sequentially transmitting each segment includes copying each segment to a storage device and transmitting said segment copy from said storage device to said second database.

19. The method of claim 17 further including the step of awaiting a response from said second database after transmitting each segment to said second database, said response indicating whether said second database contains a current copy of said record.

20. A method for synchronizing a first database and a second database, wherein each database contains a plurality of database records, said method comprising the steps of:

lexically dividing said first database into a plurality of segments;

lexically dividing said second database into a plurality of segments; and sequentially transmitting each respective segment between said first and second database such that segments not in current transmission may be modified, wherein said respective segments from each of said databases synchronize each respective outdated database simultaneously, the respective segments being stored on respective databases.

21. The method of claim 20 wherein said step of sequentially transmitting each segment between said first and second databases includes copying each segment to a storage device and transmitting said segment copy from said storage device.

22. The method of claim 20 wherein said first database updates said second database if said first database contains a current copy of a particular record and said second database contains an obsolete copy of the particular record.

23. An apparatus for synchronizing a first database with a second database, wherein said first database contains a plurality of database records, said apparatus comprising:

means for lexically dividing said first database into a plurality of segments, wherein each segment contains at least one database record;

a storage device capable of receiving a copy of at least one segment; and means for sequentially transmitting said plurality of segments from said storage device to said second database for storage in said second database, wherein segments not in current transmission may be modified.

24. The apparatus of claim 23 wherein said first database is located on a first server and said second database is located on a second server, said first and second servers coupled to one another via a communication medium.

25. The apparatus of claim 23 wherein said storage device is a memory device capable of storing at least one segment.

* * * * *